| United States Patent [19] | | [11] | 4,028,454 |
|---|---|---|---|
| Davidovits et al. | | [45] | June 7, 1977 |

[54] PROCESS FOR AGGLOMERATING COMPRESSIBLE MINERAL SUBSTANCES UNDER THE FORM OF POWDER, PARTICLES OR FIBRES

[75] Inventors: Joseph Davidovits, St. Quentin; Jean Jacques Legrand, Aisne, both of France

[73] Assignee: Coordination et Developpement de l'Innovation Societe Anonyme en abrege Cordi, St. Quentin, France

[22] Filed: Dec. 31, 1974

[21] Appl. No.: 537,719

[30] Foreign Application Priority Data

Jan. 11, 1974 France ............................ 74.00938

[52] U.S. Cl. ............................ 264/82; 264/332; 264/333; 264/DIG. 43
[51] Int. Cl.² ...................... B28B 1/26; B28B 3/00
[58] Field of Search ............ 264/109, 333, DIG. 43, 264/345, 332, 85, 86, 82; 425/812; 106/71, 72, 73

[56] References Cited

UNITED STATES PATENTS

| 1,048,616 | 12/1912 | Wheeler | 425/812 |
|---|---|---|---|
| 1,048,616 | 12/1912 | Wheeler | 264/333 |
| 1,528,908 | 3/1925 | Bleininger | 106/72 |
| 1,666,936 | 4/1928 | Kern | 264/82 |
| 2,288,047 | 6/1942 | Sullivan et al. | 106/71 |
| 2,573,141 | 10/1951 | Heinrich | 425/812 |
| 2,581,652 | 1/1952 | Goss | 425/812 |
| 2,603,570 | 7/1952 | Bole | 106/72 |
| 2,655,458 | 10/1953 | Collins | 264/109 |
| 3,431,331 | 3/1969 | Pincus et al. | 425/812 |
| 3,655,847 | 4/1972 | Morgan | 264/DIG. 43 |

FOREIGN PATENTS OR APPLICATIONS

| 4,391 | 12/1904 | United Kingdom | 106/71 |
|---|---|---|---|
| 232,943 | 12/1925 | United Kingdom | 106/71 |

*Primary Examiner*—Willard E. Hoag
*Attorney, Agent, or Firm*—Bacon & Thomas

[57] ABSTRACT

The invention pertains to a process for agglomerating compressible powders, particles or fibres of mineral substances, said process comprising the steps of placing at least one layer of a steam and gas pervious product on a layer of said compressible substances in which the water content is such that, after vaporization, a sufficient amount of water is still present to ensure the desired chemical reaction, then subjecting the layers to the simultaneous action of pressure and heating.

1 Claim, No Drawings

PROCESS FOR AGGLOMERATING COMPRESSIBLE MINERAL SUBSTANCES UNDER THE FORM OF POWDER, PARTICLES OR FIBRES

This invention relates to a process for agglomerating compressible mineral substances under the form of powder, particles or fibres in the presence of water under the combined effect of pressure and temperature for a period of time between a few seconds and a few minutes according to the nature of the reacting substances and the thickness of the resulting products.

A second object of this invention relates to novel products namely mineral materials in plates or in shapes of small thickness and the mechanical characteristics of which may be still improved by the presence of surface or inner reinforcements consisting of wires, fibres or webs.

In order to clarify the process of the invention which will be described hereafter in detail, reference will be made to the following four characteristic experiments.

First experiment

A mixture of 100 parts of dry clay and 10 parts of solid soda previously dissolved in 10 parts of water is prepared. This mixture is cold pressed to the form of a plate having a thickness of 5 mm. This plate is then deposited into a saturating steam autoclave at 150° C for 1½ hour. By this way, there is obtained a crockery-like plate having a bending strength of about 330 kg/cm².

Second experiment

There is started from the mixture used in the first experiment but, instead of cold pressing it, the press is heated to 150° C and the mixture is subjected to a pressure of 30 kg/cm². It is observed that after about 20 seconds, the plate bursts under the effect of the steam pressure. However, it is observed that the so produced fragments have a hardness as high as that obtained at the end of the first experiment, i.e. by autoclave curing for a period of about 1½ hour.

Third experiment

The conditions of the second experiment are exactly reproduced, but a metal grid is disposed between the mixture and a press platen, said grid allowing the steam to be released during the pressing operation. Like in the second experiment, the mixture is then pressed at 150° C under a pressure of 30 kg/cm². It is observed that after about 2 minutes 30 seconds, all the steam is removed without any burst in the plate. However, the bending strength is only 135 kg/cm², i.e. a bending strength far lower than that reached at the end of the first experiment. Thus, under the conditions of said third experiment, the reaction is uncomplete, i.e. the water necessary for the reaction forming the hydrosodalite has been partially removed by varporization.

Fourth experiment

There is started from the mixture used in the three previous experiments, but the water amount is increased by 50%. Thus, the mixture comprises 100 parts of clay, 10 parts of solid soda and 15 parts of water; a metal grid is disposed between the said mixture and a press platen and the mixture is subjected to a pressure of 30 kg/cm² at a temperature of 150° C. It is observed that, after a period of 3 minutes, no more steam is released, while the produced plate has mechanical characteristics approaching those obtained at the end of the first experiment, i.e. of about 310 kg/cm². However, whereas the plate treated in an autoclave during the first experiment, as well as the fragments obtained at the end of the second experiment have a homogeneous distribution of the hardness through the thickness, the plate obtained at the end of said fourth experiment has a hardness gradient through its thickness. Said hardness increases progressively away from the surface contacting the metal grid. The opposite side is extremely hard and glossy, i.e. also harder than the surface of the plate obtained at the end of the first experiment in which the mixture is treated in an autoclave. It may be admitted that the hardness gradient according to the thickness is due namely to the fact that the effective pressure of the steam increases progressively away from the surface contacting the metal grid. On said surface, the steam pressure is slightly higher than the atmospheric pressure, then it increases rapidly to reach the value of 30 kg/cm² near the opposite surface contacting the other platen of the press. Now, the pressure of the saturating steam at 150° C is 5 kg/cm². In the layers where the pressure is higher than 5 kg/cm², the water is thus under the liquid form, allowing it to efficiently perform its function, e.g. by maintaining the soda under its most reactive hydrated state. For this purpose, the water amount must be sufficient during the reaction period; this is the reason why differences are observed between the plates produced, e.g. at the end of the third experiment and at the end of the fourth experiment.

Thus, the principal object of this invention is to provide a process for agglomerating compressible substances such as powders, particles or fibres in the presence of water at a temperature higher than 100° C under the simultaneous effect of pressure and temperature, which comprises contacting at least a thickness or a layer of a steam and gas pervious product with a mixture consisting of the said compressible substances in which the water amount is such that, after vaporization, a sufficient amount thereof is still present to ensure the chemical reaction, and then subjecting the product as a whole to the simultaneous action of a mechanical pressure and a heating.

Of course, the procedure may be such that the hardness gradient observed within the plate resulting from the fourth experiment may be negligible. For this purpose, it is sufficient that the pressure to which the water is subjected in the surface contacting the metal grid, is of at least 5 kg/cm² at a temperature of 150° C. For this purpose, according to the invention, between said surface and the removal grid, are disposed the porous products which may have a steam pressure drop from 5 to 1 kg/cm² or lower than 1 kg/cm² through the thickness thereof. By way of example, sheet products like paper, cardboard, wood or powdered products which do not take part in the reaction, e.g. sand of a varying particle size, fibres, compressible particles such as, e.g. wood chips, fibre webs, individual fibres and, generally any material likely to absorb the steam and compatible with the compression of the press may be used therefor.

The vaporization rate of the liquid, generally water, depends also on the nature of the product disposed between the compressed mixture and the press platen. When this product is dry, it will absorb firstly the moisture necessary to obtain the equilibrium of steam pressure throughout its thickness, i.e. said amount of liquid will not be used in the reaction process. In order to cope with this difficulty, it is necessary either to increase proportionally the liquid amount in the mixture, or to humidify the intermediate materials. Preferably, said materials will be generally humidified to 5–20%.

All these systems are essentially characterized in that the liquid element, generally water, must never be present under the form of steam within the compressed mixture, but the release and the vaporization are carried out outside the mixture, the amount of the liquid, generally water, decreasing owing to its migration and its vaporization when contacting the porous element. However, this migration rate through the thickness is function of the vaporization rate and, accordingly, of the vaporization surface. A small vaporization surface requires a migration time and consequently a drying time for longer than that merely necessary for carrying out the desired chemical reaction.

Thus, the process according to the invention allows to substantially reduce the time periods necessary for carrying out a reaction to which a liquid, generally water, takes part either directly or as an intermediary product, thereby allowing to agglomerate powder or particle substances.

That will be the case, e.g. for the reactions using two mineral substances one of which is water soluble and which, when hydrated, has its highest reactivity or its highest ionic dissociation such as bases, acids or salts.

The substances which may be used according to the invention are under the form of powder or fibres or particles, i.e. they are compressible. The compressed material must allow a capillarity migration of the liquid, generally water, i.e. no liquid impervious layer must be formed at the temperature at which the material is compressed, which, in some cases, determines the upper limit of the pressure usable during the compression of the substances. It results that the materials manufactured according to the invention will be more or less pervious to the liquid used in the process, except naturally when a subsequent treatment suppresses this perviousness.

The process according to the invention allows to manufacture interesting products, on one hand, owing to the rapidity of the manufacturing process and, on the other hand, owing to the intrinsic properties and a very low cost price relative to the conventional techniques.

It is thereby possible to produce moulded articles or plates having a very small thickness from materials such as clays or the like which, when reinforced with fibre or web materials, are very difficultly obtained according to the conventional processes or are obtained at very high cost prices.

The following examples are not limitative and they are given for illustrating the process according to the invention.

EXAMPLE 1

A mixture of 50 parts of dry clay, 50 parts of sand and 10 parts of flakes of caustic soda is prepared. The experiment of autoclave curing shows that about 10 parts of water must be added to the mixture to complete the reaction. 5 parts of water are still added thereto. Said mixture is then spread on a metal supporting plate in a layer having a thickness of 10 mm. A thin sheet of paper and then a 1 mm mesh metal grid are then laid on this layer. The assembly is then deposited between the two platens of a press heated at 180° C. A pressure of 30 kg/cm² is applied. After 30 seconds, a steam release is observed at the side of the grid, said steam release ceasing after 2 minutes 30 seconds. The pressure release is carried out within 10 seconds. There is obtained a plate having a thickness of 4 mm, a bending strength of 310 kg/cm², said plate being also hard and similar to crockery with a smooth side and another side covered with the thin sheet of paper.

EXAMPLE 2

The operation described in example 1 is repeated but, instead of using a sheet of paper, a sheet of wood having a thickness of 2 mm and then the metal grid are laid on the mixture layer. The pressing step is carried out at 180° C under 30 kg/cm². After 1 minute, it is observed a steam release at the side of the grid, said steam release ceasing also after 2 minutes 30 seconds. The pressure release of the steam will present in the lower layers of the wood sheet. There is obtained a plate having a thickness of 4 mm and a bending strength of 350 kg/cm², both sides of this plate being smooth.

EXAMPLE 3

The operation described in example 1 is repeated but, instead of using a sheet of paper, a 3 mm layer of fine sand having a particle size between 0.2 – 0.5 mm is spread on the mixture layer; then, the metal grid is deposited. The pressing step is carried out at 180° C under 30 kg/cm². After 15 seconds, it is observed a steam release at the side of the grid, said release being completed after 2 minutes. The pressure release is carried out within 5 seconds. After having removed the non adhering sand layer, there is obtained a plate having a thickness of 5 mm and a bending strength of 240 kg/cm², one side of this plate being smooth, while the other side is rough. When humidifying sand at a moisture content of 15% instead of using dry sand, a bending strength of 310 kg/cm² is again obtained.

Another important advantage of the process according to the invention is that it allows to manufacture plates of very large sizes. In that case, it is important that, during the compression, the whole surface of the plate be subjected to uniform pressure. For this purpose, as a press bed, either the sand layer of example 3, or a layer of a compressible fibre or particle materal, e.g. wood chips, is used. Any other flexible and porous element may be also used.

EXAMPLE 4

A mixture is prepared according to example 1. This mixture is then spread on a plate on which has been previously deposited a metal grid having a thickness of 0.5 mm and meshes of 2 mm, the mixture forming a layer having a thickness of 3 mm. A sheet of wood having a thickness of 2 mm and a moisture content of 15%, and then a grid are deposited on said layer. The pressing step is carried out at 180° C under 30 kg/cm² as described in example 2. There is obtained a reinforced plate having a thickness of 1.5 mm and a very high impact strength, while it is slightly flexible and it resists perfectly to the flame of a torch.

As reinforcing elements, fibres, wires, textiles or webs of naturally compatible materials may be used. Products having a high mechanical resistance with very small thicknesses are thereby obtained.

EXAMPLE 5

A mixture is prepared according to example 1. 20 parts of wood particles previously coated with cement are added to said mixture. A layer having a thickness of 10 mm is then spread on a metal support. The plate obtained according to example 4 and then the metal grid are deposited on said layer. The pressing step is carried out at 180° C under 30 kg/cm² as described in example 2.

Being steam pervious, the plate obtained in example 4 has the same function as the wood sheet of example 2; in addition, it is very resistant to the temperature and the various chemical agents.

The term "plate" used in the previous examples means any shape which may be obtained either by pressing or by stamping or by moulding. It is necessary that at least one of the mould sides is provided with the controlled vaporization means comprising either a layer of a porous product renewed at each run, e.g. paper, or a layer of a fibre or particle product renewed at each run, e.g. sand and wood chips, or a layer of a porous product fixed on a mould element, e.g. wood sheet or any porous, rigid or flexible surface when a smooth surface is additionally desired, or a grid or a plate perforated according to the particle size of the substances being moulded.

The invention relates to the described process as well as generally to any product obtained by using said process.

It is understood that various modifications may be brought by those skilled in the art to the devices or the processes described in the foregoing only by way of non limitative examples without departing from the scope of this invention.

What we claim is:
1. The method of making a plate, comprising:
   a. forming a mixture of clay, caustic soda and water into a moldable mass;
   b. placing said mass between press platens,
   c. between said mass and said platens disposing moistened layers of porous material and disposing perforated grid members between said layers and said platens,
   d. pressing and mass between said layers and grid members with said platens heated to at least 150° C for a sufficient time to react said mixture and to form and cure said plate.

* * * * *